Dec. 23, 1958　　　W. G. JENSEN　　　2,865,671
SPRAYING ATTACHMENT FOR LAWN MOWER
Filed Sept. 7, 1956　　　2 Sheets-Sheet 1

William G. Jensen
INVENTOR.

BY *Clarence A. O'Brien*
*and Harvey B. Jacobson*
Attorneys

Dec. 23, 1958 W. G. JENSEN 2,865,671
SPRAYING ATTACHMENT FOR LAWN MOWER
Filed Sept. 7, 1956 2 Sheets-Sheet 2
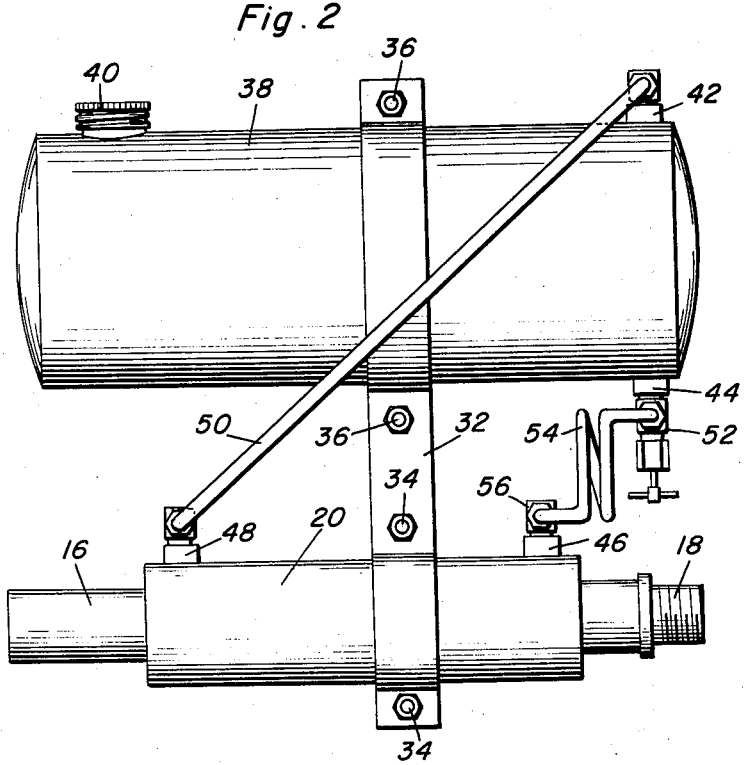
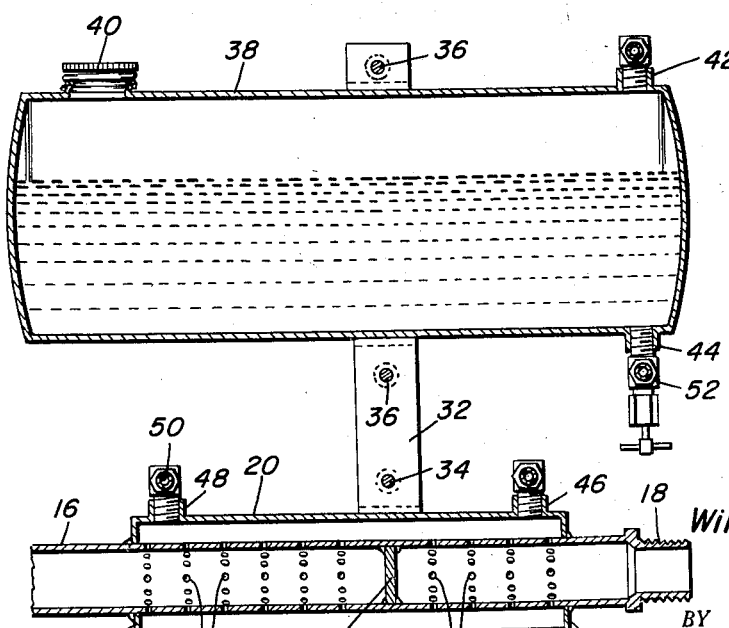
William G. Jensen
INVENTOR.

United States Patent Office 2,865,671
Patented Dec. 23, 1958

2,865,671

SPRAYING ATTACHMENT FOR LAWN MOWER

William G. Jensen, Lafayette, Wis.

Application September 7, 1956, Serial No. 608,499

6 Claims. (Cl. 299—30)

This invention comprises a novel and useful attachment for lawn mowers and more particularly relates to a device adapted to be mounted upon and operated by a lawn mower for vaporizing and spraying a liquid such as an insecticide.

The primary purpose of this invention is to provide an attachment particularly adapted for mounting upon and operation by a lawn mower for spraying insecticide.

A further object of the invention is to provide an apparatus in accordance with the preceding object which may be so mounted upon a lawn mower that the liquid vaporized and sprayed may be discharged at a constant elevation and at an effective distance above the ground during operation of the lawn mower which thus imparts mobility to the apparatus.

Yet another object of the invention is to provide an apparatus highly effective for the vaporizing and spraying of liquids and which shall be conveniently and effectively mounted upon a lawn mower for transportation thereby, and wherein the vaporization of the liquid shall be effected entirely by the heat and velocity of the exhaust gases of an internal combustion engine forming the power plant for a power lawn mower.

A still further important object of the invention is to provide an apparatus in accordance with the foregoing objects which is adapted to be supported entirely upon and solely by the exhaust pipe of the lawn mower engine.

A still further important object of the invention is to provide a liquid vaporizing and spraying apparatus as set forth in the preceding objects wherein the exhaust pipe of the internal combustion engine forming the power plant of the lawn mower shall be utilized for the joint functions of supporting the device as an attachment; applying the pressure of the exhaust gases to produce a uniform flow of the liquid to a vaporizing chamber; shall utilize the heat of the exhaust gases for vaporizing the liquid to be sprayed; and shall mix the vaporized liquid with exhaust gases to further produce a mist for spraying purposes; and wherein the velocity of flowing exhaust gases shall be utilized to effect a satisfactory dispersal and discharge of the vaporized liquid from the device.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is an elevational view of the attachment adapted to be secured to the exhaust pipe of the engine of a lawn mower;

Figure 4 is a vertical central longitudinal sectional view through the apparatus of Figure 2.

Figure 1:
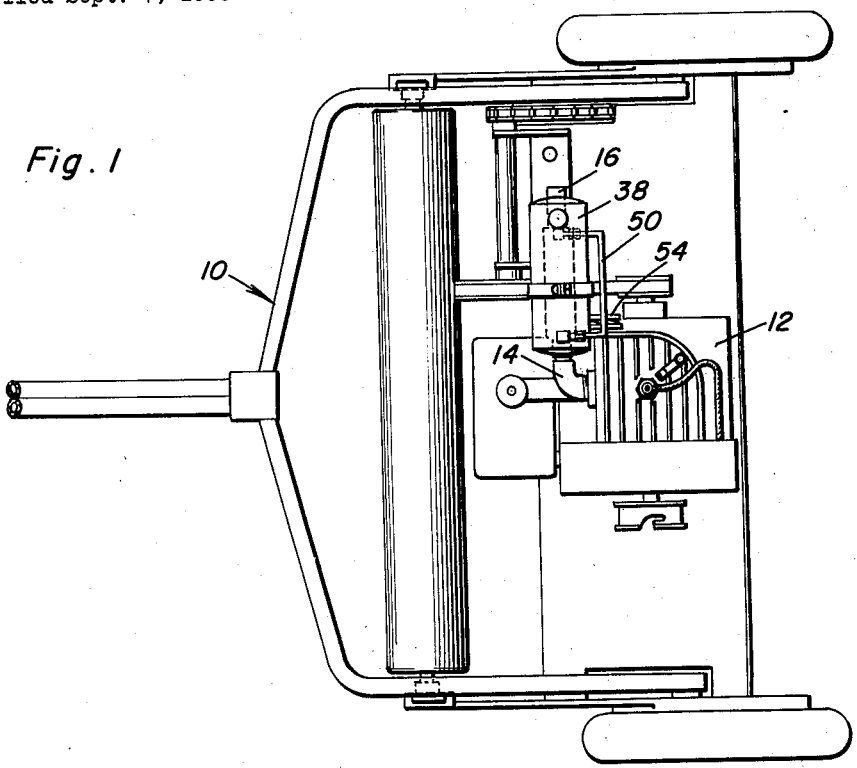
Figure 1 is a top plan view of a portion of a lawn mower of a conventional type and which is power operated by an internal combustion engine, to which an apparatus in accordance with the principles of this invention has been operatively associated.

The present invention relates primarily to an apparatus for vaporizing and spraying a liquid such as an insecticide or the like, and while certain principles of the invention are applicable generally to vaporizers, the invention, as illustrated in the drawings, is particularly and efficiently adapted for use with a power lawn mower of the type having an internal combustion engine as its source of power.

Referring now particularly to the drawings it will be seen that a conventional form of power operated lawn mower, designated generally by the numeral 10 has mounted thereon a conventional type of internal combustion engine 12 forming the source of power of the same. This engine is operatively associated with the wheels of the lawn mower in a conventional manner, but since the principles of this invention are in no way limited by the manner in which the engine is controlled, mounted or operatively connected to the lawn mower for driving the same, a detailed description thereof has been omitted as being superfluous to an understanding of the present invention.

However, the engine 12 is provided with a fitting 14 constituting the exhaust pipe or a part thereof. The attachment forming the subject matter of this invention is particularly adapted for use with and for mounting upon this fitting or the exhaust pipe carried thereby.

Figure 3:
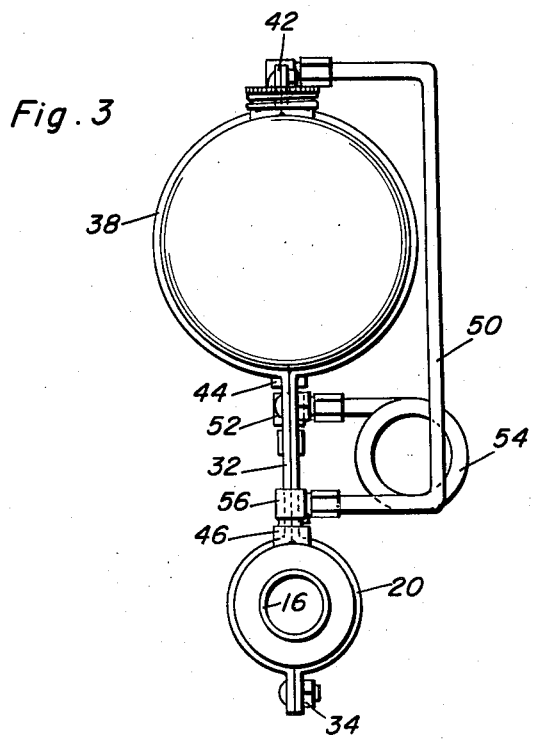
Figure 3 is an end elevational view of the arrangement of Figure 2, taken from the right end thereof.

Referring now more particularly to Figures 2 and 3 it will be seen that the apparatus constituting the attachment to be applied to the lawn mower consists of a conduit 16 having at one end a nipple or coupling 18 adapted to be secured to the fitting 14 or to an exhaust pipe section carried thereby. Thus the conduit 16 receives the exhaust gases discharged from the exhaust port of the engine through the fitting 14.

Surrounding the conduit 16 is a casing 20 consisting of a cylindrical sleeve which has its end walls 22 and 24 secured to the conduit 16 in air tight sealed engagement therewith. The casing 20 surrounding the conduit 16 constitutes therewith a chamber or vaporizer as set forth hereinafter.

Intermediate the ends of the casing 20 the conduit 16 is provided with a partition 26 which prevents direct flow through the conduit. Upon both sides of this partition, the conduit is provided with a plurality of ports or apertures 28 upon the upstream side of the partition and 30 upon the downstream side thereof. The ports 28 and 30 thus establish a continuous communication between the conduit and the interior of the casing 20, whereby exhaust gas discharged from the internal combustion engine will enter the conduit 16 at the coupling 18, will then pass from the ports 28 into the chamber or casing 20, upon the upstream side of the partition 26; and thereafter will reenter the conduit 16 through the ports 30 on the downstream side of the partition 26 and be subsequently discharged from the open outer end of the conduit 16 to the atmosphere for a purpose which will be subsequently apparent.

Referring now to Figures 2, 3 and 4 it will be seen that a support bracket or clamp 32 has its lower end clamped about the casing 20 as by fastening bolts 34, and rising above the casing has its upper end clamped by the fastening bolts 36 about a storage tank 38. The latter is provided with a filling cap 40 and preferably adjacent one end thereof with upwardly and downwardly directed internally threaded bosses 42 and 44. The top side of the casing 20 is also provided with a pair of internally threaded upstanding bosses 46 and 48. A pipe or conduit 50 of any suitable type connects the boss 48 of the casing 20 with the upper boss 42 of the tank and provides a passage whereby the pressure prevailing within the vaporizer chamber in the casing 20 may be continuously and freely applied to the interior of the storage tank 38.

Secured in the depending boss 48 is a valved fitting 52 which is connected by a conduit 54 to a fitting 46 engaged in the boss 46 of the vaporizer casing. The conduit 44 constitutes a means for feeding liquid from the tank 38 into the vaporizer chamber of the casing 20.

Figure 5:
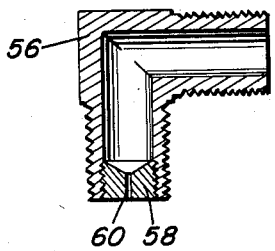
Figure 5 is a detail view in central section through a flow metering construction forming a part of the apparatus.

Referring now to Figure 5 it will be seen that the fitting 56 is provided with a metering plug 58 screw threadedly engaged at one end thereof, which plug is provided with a metering orifice 60 therein. It is contemplated that the plug 58 may be exchanged for one having a different sized orifice in order that the desired rate of feed for a given installation may be effected.

As so far described it will now be apparent that the exhaust gases from the engine flowing through the conduit 16 and the casing 20 will produce equal pressure within the vaporizing chamber and in the tank 38. Consequently, the liquid within the tank 38 may feed by gravity when the valve of the fitting 52 is opened, through the conduit 54 and by means of the metering orifice 58 at a constant rate of flow into the vaporizer chamber.

The operation of the invention is as follows: With the coupling 18 of the conduit 16 secured in the exhaust pipe of the internal combustion engine, the entire apparatus is supported thereby with the liquid tank 38 being disposed above the vaporizer casing 20 in order to provide a gravity head for the liquid to be vaporized. The exhaust gases flowing into the conduit 16 are discharged from the ports 28 into the chamber 20, where they pick up the liquid flowing at a constant rate through the feed conduit 54, vaporize this liquid and atomize the same. The mingled exhaust gas and vaporized liquid dispersed therein then reenter the conduit 16 through the ports 30 on the other side of the partition 26 and are discharged in the form of a mist by the flow of the exhaust gases from the end of the conduit 16. Thus the liquid is thoroughly atomized and vaporized and is discharged in the form of a fine spray or fog at a constant elevation with respect to the ground, area or plants to be treated, during operation of the lawn mower.

Although the partition 26 has been described as a solid member, it is obvious that in lieu thereof there may be employed a diaphragm having orifices of desired area in order to produce a throttled or restricted flow rather than a complete stoppage of direct flow, if desired.

It should be noted that by virtue of the gases flowing through the casing, that the fitting 56 by which the liquid enters the vaporizing chamber is subjected to an aspirating effect by the flowing gases.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A spraying attachment for power operated lawn mowers of the type having as the power plant therefor an internal combustion engine operatively connected thereto and including an exhaust pipe, said attachment being mounted upon and supported solely by said exhaust pipe and comprising a conduit with means for connecting the same to and supporting the same from said exhaust pipe, a casing mounted upon and surrounding said conduit, said casing being sealed from direct communication with the atmosphere and forming with said conduit a vaporizer chamber, means connected to said chamber and to said exhaust pipe for passing exhaust gases through said chamber, a tank for a liquid to be vaporized and sprayed, means mounting said tank upon said casing, means connected to said tank and to said chamber for feeding a liquid from said tank to said chamber at a constant rate whereby to vaporize said liquid in said chamber by the heat of the exhaust gases passing through said conduit, means connected to said chamber for discharging vaporized liquid from said chamber into said exhaust pipe.

2. The combination of claim 1 including a partition in said conduit blocking direct flow of exhaust gases therethrough, said conduit having ports on opposite sides of said partition communicating with said chamber.

3. The combination of claim 2 including a pressure equalizing passage establishing communication between said chamber and said tank.

4. The combination of claim 1 wherein said tank mounting means includes a bracket embracing said tank and said casing.

5. The combination of claim 1 wherein said casing comprises a sleeve surrounding said conduit and having its ends sealed to the exterior surface of said conduit.

6. The combination of claim 5 including a pressure equalizing passage establishing communication between said chamber and said tank.

References Cited in the file of this patent

UNITED STATES PATENTS

| | | |
|---|---|---|
| 514,523 | Boas | Feb. 6, 1894 |
| 1,973,715 | Justheim | Sept. 18, 1934 |
| 2,528,927 | Vose | Nov. 7, 1950 |
| 2,611,992 | Coy | Sept. 30, 1952 |
| 2,685,146 | Stevens | Aug. 3, 1954 |
| 2,737,340 | Bonni | Mar. 6, 1956 |
| 2,759,292 | Whipple et al. | Aug. 21, 1956 |

FOREIGN PATENTS

| | | |
|---|---|---|
| 716,299 | France | Sept. 4, 1930 |